(12) United States Patent
Farrell

(10) Patent No.: US 6,939,088 B2
(45) Date of Patent: Sep. 6, 2005

(54) PNEUMATIC TRANSPORT AIR SHIFTER

(75) Inventor: Robert M. Farrell, Arlington Heights, IL (US)

(73) Assignee: Protech Structural Industries, Arlington Heights, IL (US)

( * ) Notice: Subject to any disclaimer, the term of this patent is extended or adjusted under 35 U.S.C. 154(b) by 62 days.

(21) Appl. No.: 10/295,222

(22) Filed: Nov. 15, 2002

(65) Prior Publication Data

US 2004/0096279 A1 May 20, 2004

(51) Int. Cl.[7] .............................................. B65G 51/22
(52) U.S. Cl. ........................ 406/192; 406/21; 406/184
(58) Field of Search ............................. 406/19, 20, 21, 406/22, 23, 24, 184, 191, 192

(56) References Cited

U.S. PATENT DOCUMENTS

| | | | |
|---|---|---|---|
| 1,753,987 A | * | 4/1930 | Hohne .......................... 406/19 |
| 3,237,881 A | * | 3/1966 | Grosswiller, Jr. et al. ..... 406/19 |
| 3,306,555 A | * | 2/1967 | Tonne .......................... 406/19 |
| 3,419,229 A | * | 12/1968 | Crosby ....................... 406/110 |
| 3,711,038 A | * | 1/1973 | Van Otteren ................. 406/19 |
| 3,976,264 A | | 8/1976 | Ekama |
| 4,008,865 A | | 2/1977 | White |
| 4,059,246 A | | 11/1977 | Anders |
| 4,084,769 A | | 4/1978 | Tyler |
| 4,135,684 A | | 1/1979 | Willey |
| 4,157,796 A | | 6/1979 | Warmann |
| 4,180,354 A | | 12/1979 | Greene |
| 4,239,420 A | * | 12/1980 | Thibonnier et al. ............ 406/2 |
| 4,256,418 A | | 3/1981 | Stangl |
| 4,820,086 A | | 4/1989 | Kieronski |
| 5,215,412 A | | 6/1993 | Rogoff |
| 6,146,057 A | | 11/2000 | Gromley |
| 6,164,491 A | | 12/2000 | Bustos |

* cited by examiner

Primary Examiner—Joe Dillon, Jr.
(74) Attorney, Agent, or Firm—Meroni & Meroni, P.C.; Charles F. Meroni, Jr.; P. Derek Pressley (57) ABSTRACT

A pneumatic transfer system having a modular pneumatic shifting device. A teller conduit has a teller station and a customer conduit has a customer station. A housing having apertures connected to the teller conduit and the customer conduit has a teller gate and a customer gate intermittently obstructing the apertures. A differential pressure generating mechanism is connected to the housing. A plurality of sensors send signals to a programmable means when a carrier pass through the system actuating movement of the gates and operation of the differential pressure generating mechanism.

29 Claims, 11 Drawing Sheets

PNEUMATIC TRANSPORT AIR SHIFTER

BACKGROUND OF THE INVENTION

1. Field of the Invention

The present invention generally relates to pneumatic devices. More specifically, the present invention relates to pneumatic transfer systems.

2. Description of the Prior Art

Many different types of businesses have turned to drive through type customer interface systems in order to make doing business more convenient for the customer and more cost effective for businesses. Most of these business transactions can be performed by way of a pneumatic transfer system that employs a carrier sized and shaped to fit within a conduit that extends from a sending and receiving station within the building where the business is located to a sending and receiving station outside of the building positioned so that a customer can easily make a transaction via the pneumatic transfer system while sitting inside a motor vehicle. Several of these systems that exist in the prior art are disclosed here.

U.S. Pat. No. 6,164,491 issued to Bustos et al. discloses a pneumatic product vending and delivery system preferably using an existing product vending machine as a storage and loading device for use in a pneumatic vending and delivery system along with an interface unit in place of the vending machine door. A product dispensing terminal is provided that is connected by the delivery tube of a pneumatic conveyor from the storage and loading device, which has a loading mechanism configured to load a product dispensed by the dispensing mechanism into the delivery tube. The pneumatic conveyor includes a back pressure source operable to apply reverse pressure to a product in the delivery tube to gently slow a product approaching the product dispensing terminal through the tube.

U.S. Pat. No. 4,059,246 issued to Anders et al. discloses a pneumatic tube system for conducting banking transactions with a non-captive carrier traveling between a bank teller terminal in a two-tube carrier conveyor connected with a remote customer terminal with visual communication between the teller and the customer. The operation of a blower located at the customer terminal, which supplies air for pressure or vacuum movement of the carrier in the two system, is controlled by carrier arrival at or dispatch from either terminal.

U.S. Pat. No. 6,146,057 issued to Gromley discloses a pneumatic transfer apparatus that utilizes a pair of centrally located blowers to create a pressure differential within the system.

U.S. Pat. No. 4,180,354 issued to Greene discloses a pneumatic transmission system adapted to send a carrier from one terminal to a second terminal with apparatus to control the free delivery of the carrier to a terminal comprising a check valve to relieve pressure behind a carrier once it has passed a check valve and an adjustable air valve to control the negative pressure ahead of the carrier to control the free delivery of the carrier from the end of the transmission tube in a single tube reversing system with negligible amount of air being taken into or discharged from the open terminal.

U.S. Pat. No. 5,215,412 issued to Rogoff discloses a pneumatic transport system, particularly useful as a mail transport system, which includes a transport carrier moving through a pneumatic tube line between remote sending/receiving stations is described. Movement of the transport carrier through the pneumatic tube line is by means of a positive or negative air flow in the tube line provided by a blower means. The air flow direction is controlled by utilizing a series of adjustable valves, such as butterfly valves. The system additionally employs sensors for indicating the presence of the carrier in the exterior station.

Many of these types of systems have been employed for many years and have become expensive to maintain as they have aged. An alternative to the expensive proposition of constantly repairing a worn out system is needed. The claimed invention provides a pneumatic shifter device that can be used as a retrofit to an existing system that eliminates the cycle of repairing a worn out system. The claimed invention also provides a pneumatic shifter device that can be installed in a newly constructed pneumatic transfer system that may be maintained more easily and more cost effectively.

SUMMARY OF THE INVENTION

To fulfill the foregoing need, as well as others that will become apparent after a reading of the specification, claims and appended drawings, a pneumatic shifting device is provided.

An objective of the claimed invention is to provide a pneumatic shifting device that may be retrofitted to an existing pneumatic transfer system.

Another objective of the claimed invention is to provide a pneumatic transfer system of simplified design.

A further objective of the claimed invention is to provide a pneumatic shifting device that does not require doors at either end of the pneumatic transfer system in order to make the system function.

An even further objective of the claimed invention is to provide a pneumatic shifting device that that is easier to maintain by providing a single point of service for repair of the pneumatic shifting device.

The claimed invention provides a pneumatic shifting device for use in pneumatic transfer systems. The system comprises a housing having a teller side aperture and a customer side aperture, each sized and shaped to receive a pneumatic transfer system conduit. The apertures are coaxially aligned so that a carrier sized and shaped to fit through the transfer system conduit may pass through the housing. A center transfer tube connects the teller side aperture and the customer side aperture so that the carrier may pass into one aperture and out the other. A differential pressure generating mechanism having a connection to the housing is used to create a pressure difference within the transfer system.

A moveable teller gate adjacent the teller side aperture intermittently obstructs the teller side aperture allowing the differential pressure generating mechanism to create a pressure difference within one half of the pneumatic transfer system. Correspondingly, a customer gate adjacent the customer side aperture intermittently obstructs the customer side aperture creating a pressure difference within an opposite half of the pneumatic transfer system. The operation of the gates are linked such that only one of the gates will obstruct either the teller side aperture or the customer side aperture at any one point in time. The gates are spaced within the housing such that a carrier will fit between the gates without interfering with movement of the gates.

A teller sensor positioned between the teller sending and receiving station and the teller side gate senses when a carrier moves past the sensor. The teller sensor is wired to a programmable logic controller controlling movement and operation of the teller side gate and the customer side gate as well as the differential pressure generating mechanism.

A customer sensor positioned between the customer sending and receiving station and the customer side gate senses when a carrier moves past the sensor. The customer sensor is also wired to the programmable logic controller controlling movement and operation of the teller side gate and the customer side gate as well as the differential pressure generating mechanism.

A shifter sensor positioned on an outer surface of the center transfer tube senses when a carrier enters the shifter housing. The shifter sensor is wired to the programmable logic controller controlling movement and operation of the teller side gate and the customer side gate as well as the differential pressure generating mechanism.

The invention also includes a method of pneumatically moving an object through a pneumatic transfer system. The method comprises introducing a first obstruction creating an interior first section of a tube system adjacent a first end of a transition point. Next, an object sized and shaped to cooperatively fit within the tube system is introduced into the first section of the tube system. Next, a pressure differential generating mechanism is operated at the transition point creating a pressure difference across the object within the first section moving the object within the interior of the first section toward the transition portion. The pressure differential generating mechanism then deactivates upon sensing the object at the transition point. The first obstruction is then removed. Next, a second obstruction is introduced creating an interior second section of the tube system adjacent a second end of the transition point. The pressure differential generating mechanism is activated at the transition point creating a pressure difference across the object within the second section moving the object within the second section. The pressure differential generating mechanism deactivates upon sensing movement of the object past the point within the second section.

BRIEF DESCRIPTION OF THE DRAWINGS

FIG. 11.

DETAILED DESCRIPTION OF THE PREFERRED EMBODIMENT

Turning now to the drawing, a pneumatic shifting device 10 for use in a pneumatic transfer system 15 is shown in FIGS. 1–10. The device 10 generally comprises a housing 20 having a teller side aperture 30 and a customer side aperture 40, a center transfer tube 50, a pressure and vacuum turbine 60, a teller gate 70, a customer gate 80, a teller sensor 90, a customer sensor 100, and a shifter sensor 110. A programmable logic controller (PLC) controls the movement of the gates 70, 80 and the activation of the turbine 60. The pneumatic shifting device 10 is preferably placed at the center of the transfer system 15 as shown in FIGS. 1–10, but may be placed anywhere along the center length of the transfer system 15 as long as the turbine 60 has sufficient pressure differential generating capabilities to move objects through the transfer system 15. It is contemplated that one of the pneumatic shifting devices 10 will be used for every teller side aperture 30 and customer side aperture 40 pair.

Figure 10:
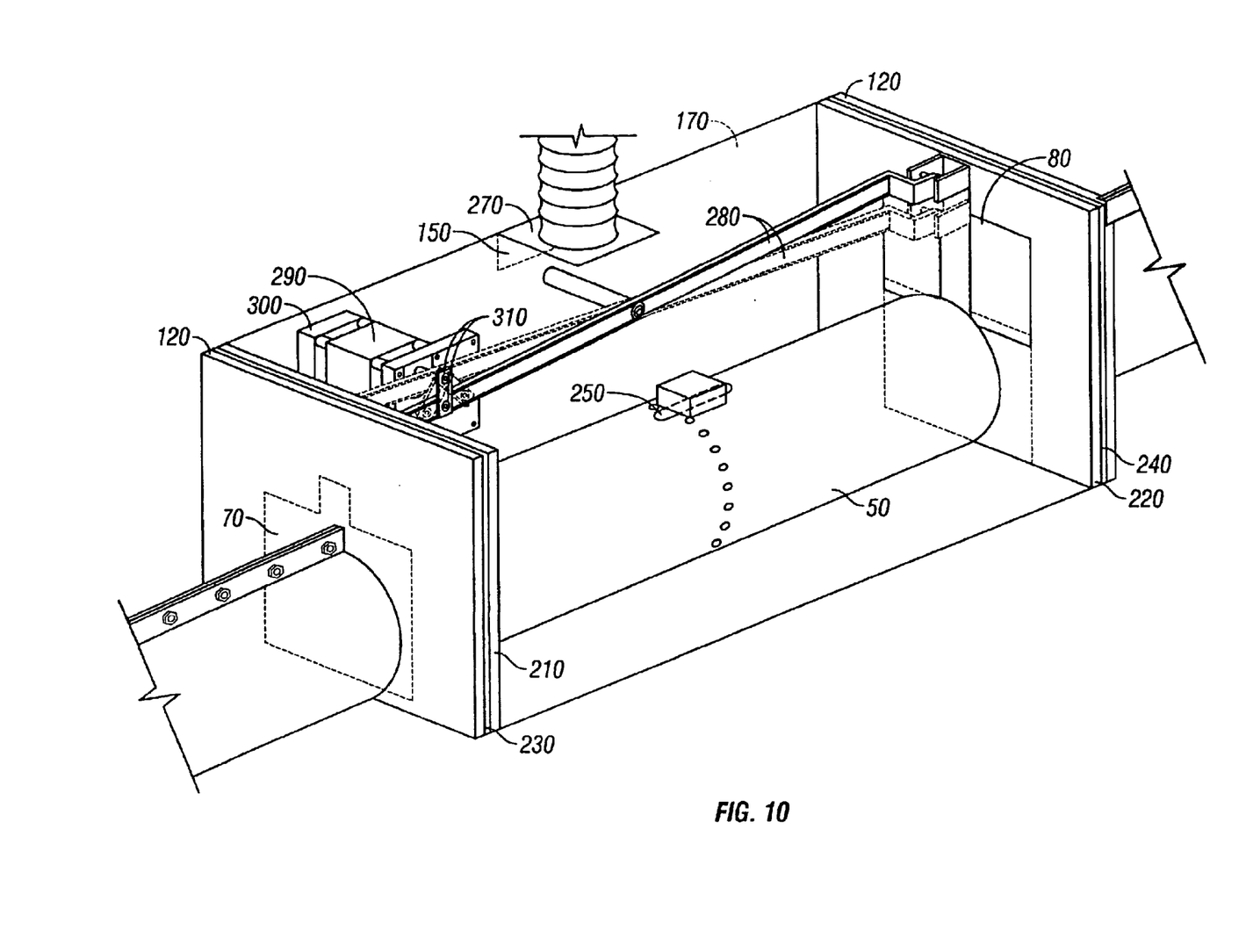
FIG. 10 shows a cross sectional view of the device.
Figure 11:
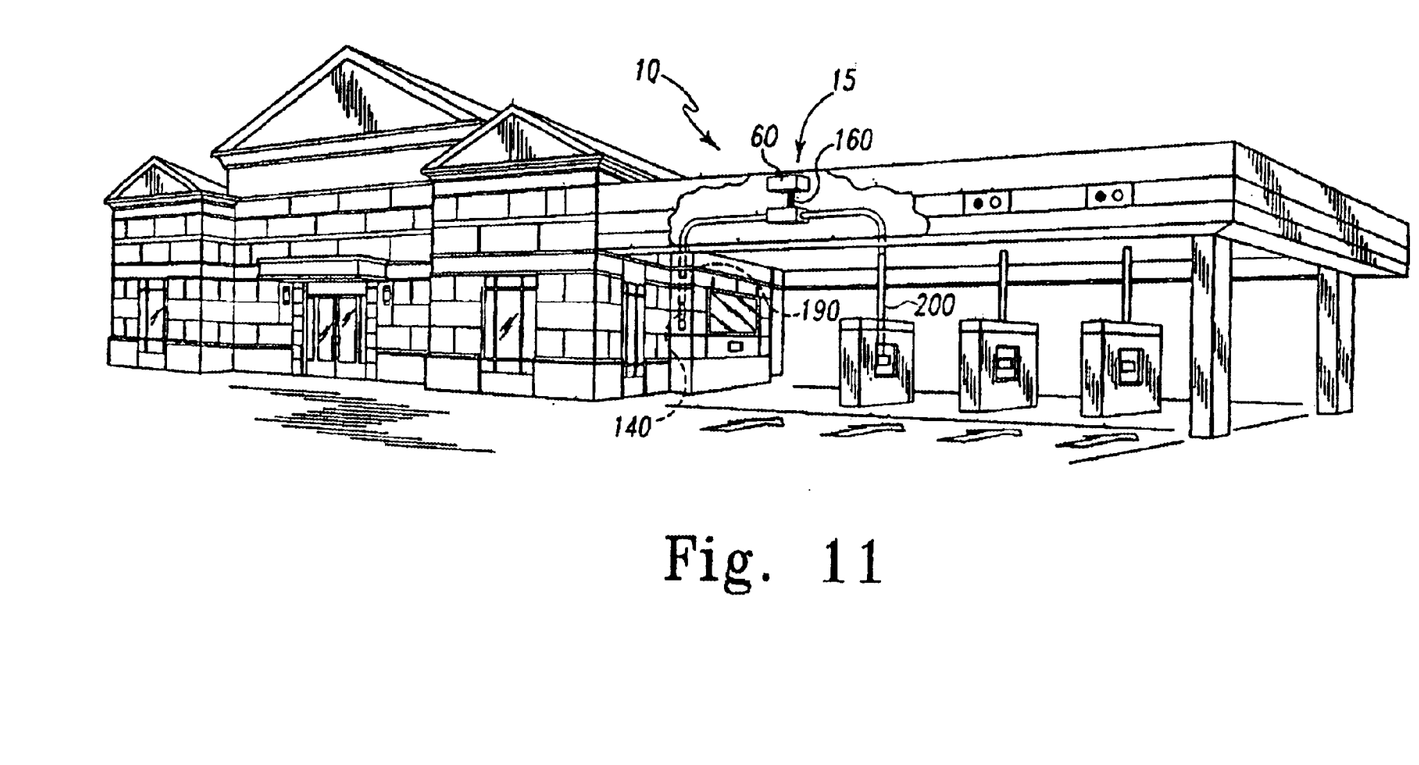
FIG. 11 is a perspective view of a facility with parts broken away to show a pneumatic transfer system as installed in the facility.

The housing 20 as shown in FIG. 10 is preferably 30"×12 1/16"×7 1/8" and is made of zinc plated 16 gauge cold rolled steel. However, the dimensions of the housing 20 may vary depending upon the particular application and may also be made of other durable materials such as aluminum or plastic. End caps 120 are fitted on either end of the housing 20 having an aperture within the wall creating a teller side aperture 30 and a customer side aperture 40. The teller side aperture 30 and the customer side 40 aperture are each sized and shaped to receive a pneumatic transfer system conduit 130.

There are several different sizes of conduit 130 that are commonly used in pneumatic transfer systems 15 with the most common being 4 1/2" in diameter. During fabrication of the housing 20, an end cap 120 having an aperture 30, 40 corresponding to the diameter of the conduit 130 is selected to be attached to the housing 20. The teller side aperture 30 and the customer side aperture 40 illustrated in FIGS. 1–10 are shown as 4 1/2" diameter apertures. The apertures 30, 40 are coaxially aligned so that a carrier 140 sized and shaped to fit through the transfer system conduit 130 may pass through the center transfer tube 50. The housing 20 also has an aperture 150 through one corner allowing the turbine hose 160 to be mounted on a side surface 170 of the housing 20 or a top surface 180 of the housing 20 depending upon the particular application of the system 15.

The carrier 140 has a sealing ring at each end sized and shaped to partially restrict airflow between the carrier 140 and the inner walls of the conduit 130. The close fitting relationship of the sealing rings with the inner walls of the conduit 130 causes air moving within the conduit 130 to move the carrier 140 within the conduit 130. When pressure or vacuum is applied to the system 15, a pressure difference is created across the carrier 140 due to the restricted airflow between the sealing rings of the carrier 140 and the inner walls of the conduit 130.

A center transfer tube 50 connects the teller side aperture 30 and the customer side aperture 40 so that the carrier 140 may pass from the teller side conduit 190 through the housing by way of the center transfer tube 50 and through the customer side conduit 200. The center transfer tube 50 is preferably a cold rolled steel 28 5/8" long tube having a diameter equal to the diameter of the conduit being used in the pneumatic transfer system 15. The center transfer tube 50 illustrated in FIG. 10 is shown as being a 4 1/2" diameter tube. End plates 210, 220 on either end of the center transfer tube 50 sized and shaped to fit within the end cap 120 create a slot 230, 240 between the outer faces of the end plates 210, 220 and the inner faces of the end caps 120 where the teller gate 70 and the customer gate 80 travel. A slot 250 is placed in the center transfer tube 50 so that the sensor portion of a mechanical limit switch 110 can be placed within the center transfer tube 50 to sense when a carrier 140 moves through the center transfer tube 50.

When the carrier enters the center transfer tube from the teller side of the system during operation, the carrier is brought to a stop within the center transfer tube by a cushion of air between the front sealing ring of the carrier and the closed customer gate 80. When the position of the gates reverse so that the teller gate 70 is closed and the customer gate 80 is open, the carrier 140 has to be pushed out of the center transfer tube and through the customer side aperture. A plurality of vent apertures are placed about the center of the center transfer tube 50 so that the front sealing ring of the carrier is positioned between the vent apertures and the customer side aperture. When the PLC switches the turbine on to push the carrier out of the center transfer tube, pressure from the turbine enters the center transfer tube through the vent apertures and pushes against the front sealing ring to propel the carrier out of the center transfer tube and into the customer side conduit.

The PLC (not shown) that operates the teller gate 70 and sensor 90, the customer gate 80 and sensor 100, the turbine 60, and the shifter sensor 110 is preferably an Omron CPM-1A-10CDR-A, but may be of some other manufacture that is suitable for the application. The PLC is preferably mounted within the housing 20 but may be mounted elsewhere depending upon the application of the air shifter system 15.

The pressure and vacuum turbine 60 creates pressure and vacuum within the pneumatic transfer system 15. The turbine 60 illustrated in FIGS. 1–10 is a preferably an Model 115923 manufactured by Ametec, a subdivision of National Controls Corporation. The mounting of the turbine 60 is determined by the particular application for which the device is to be used. A hose 160 from the turbine 60 is connected to the aperture 150 through the corner of the housing 20. A bracket 270 mounts the hose 160 so that it opens into the side 170 of the housing 20 for certain applications or on a top side 180 for other applications.

A moveable teller gate 70 adjacent the teller side aperture 30 intermittently obstructs the teller side aperture 30 allowing the turbine 60 to create a pressure difference within one half of the pneumatic transfer system 15. The teller gate 70 is preferably made of 304 stainless steel and is 6⅞"×5¹⁵⁄₁₆". Correspondingly, a customer gate 80 of similar construction adjacent the customer side aperture 40 intermittently obstructs the customer side aperture 40. A seal is created within the slot 230, 240 between the outer faces of the end plates 210, 220 and the inner faces of the end caps 120 when one of the gates 70, 80 completely obstructs the teller side aperture 30 or the customer side aperture 40. The seal that a gate 30, 40 creates within the pneumatic shifter 10 enables the turbine 60 to create pressure and vacuum within one half of the system 15.

The operation of the gates 70, 80 are linked such that only one of the gates will seal either the teller side aperture 30 or the customer side aperture 40 at any one point in time. FIG. 10 shows how a camming arm 280 alternately moves the teller gate 30 and the customer gate 40 within the slots 230, 240. A motor 290, preferably a model number OGM-5026-1 motor manufactured by Molon Motor and Coil Corporation, is mounted on a motor mount 300 within the housing 20. The motor 290 moves the cam arm 280 as the cam 310 that is connected to the motor 290 rides within the cam arm 280. The motor 290 is actuated by the PLC when the PLC receives a signal from one of the sensors 90, 100, 110.

The type of sensors used in a particular pneumatic transfer system 15 depends upon the type of carrier 140 used in the system. Mechanical limit switches are used in pneumatic transfer systems 15 that utilize plastic carriers 140 to move items through the system 15. Preferably, a Microswitch model BZ-2RW863-A2 mechanical limit switch is used to detect plastic carriers 140, however, other limit switches may be employed in a similar manner to detect when a carrier 140 passes by the sensor. Proximity switches are use in pneumatic transfer systems 15 that utilize metal carriers 140 to move items through the system 15. Preferably, a model ICE 5010 proximity switch made by IFM Efector, Inc. is used to detect metal carriers 140, however, other proximity switches may be employed in a similar manner to detect when a carrier 140 passes by the sensors.

The teller sensor 90 is located between the teller sending and receiving station 330 and the teller side gate 70. The customer sensor 100 is located between the customer sending and receiving station 340 and the customer side gate 80. The response time of the PLC and the movement time of the teller side gate 70 and the customer side gate 80 must be taken into consideration when placing the teller sensor 90 and the customer sensor 100 on the transfer system conduit 130 at intervals from the teller side gate 70 and the customer side gate 80. The shifter sensor 110 is attached to an outer surface of the center transfer tube 50 and sends a signal to the PLC when the shifter sensor 110 senses a carrier 140 moving past the sensor 110.

Figure 1:
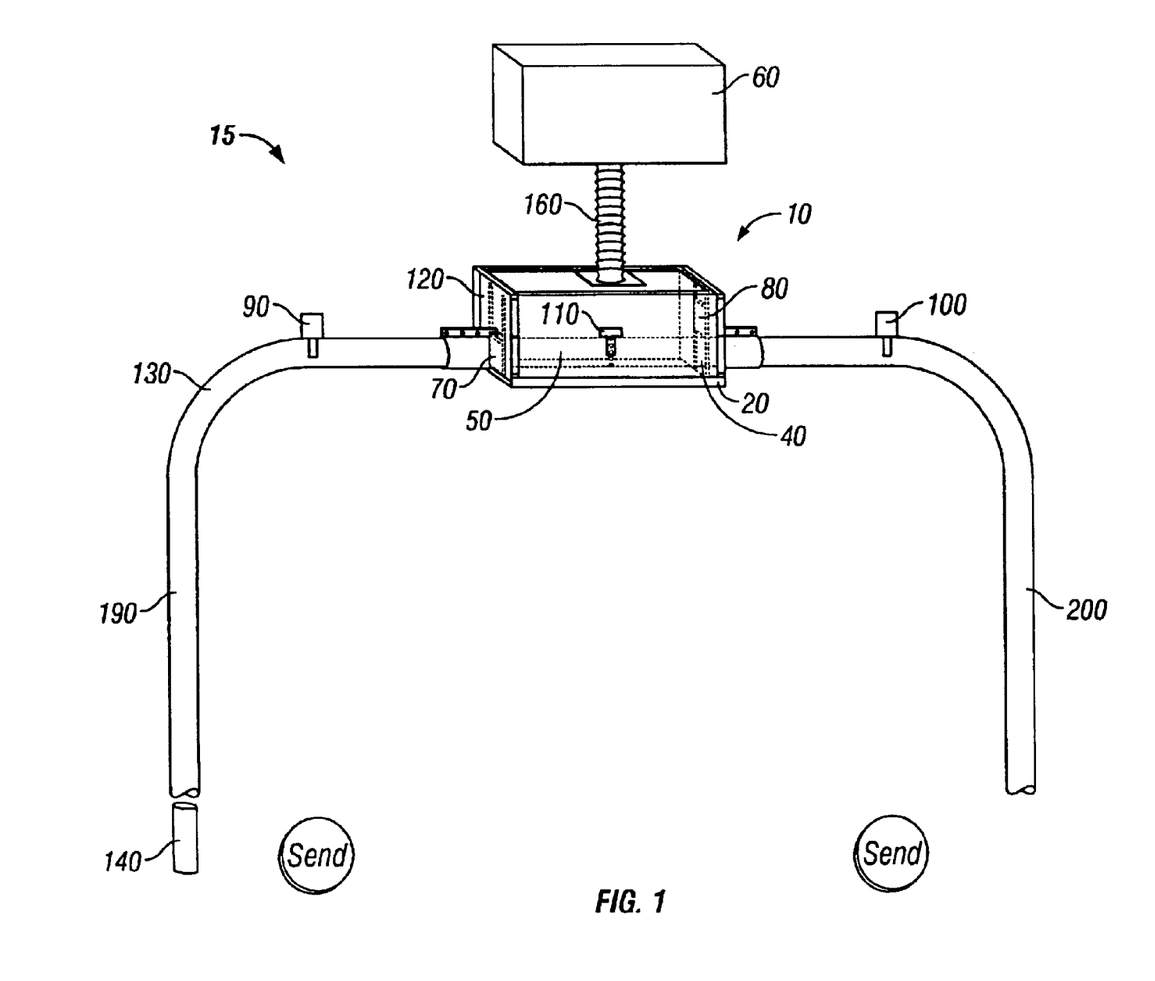
FIG. 1 shows the operation and position of the device and system at rest.
Figure 2:
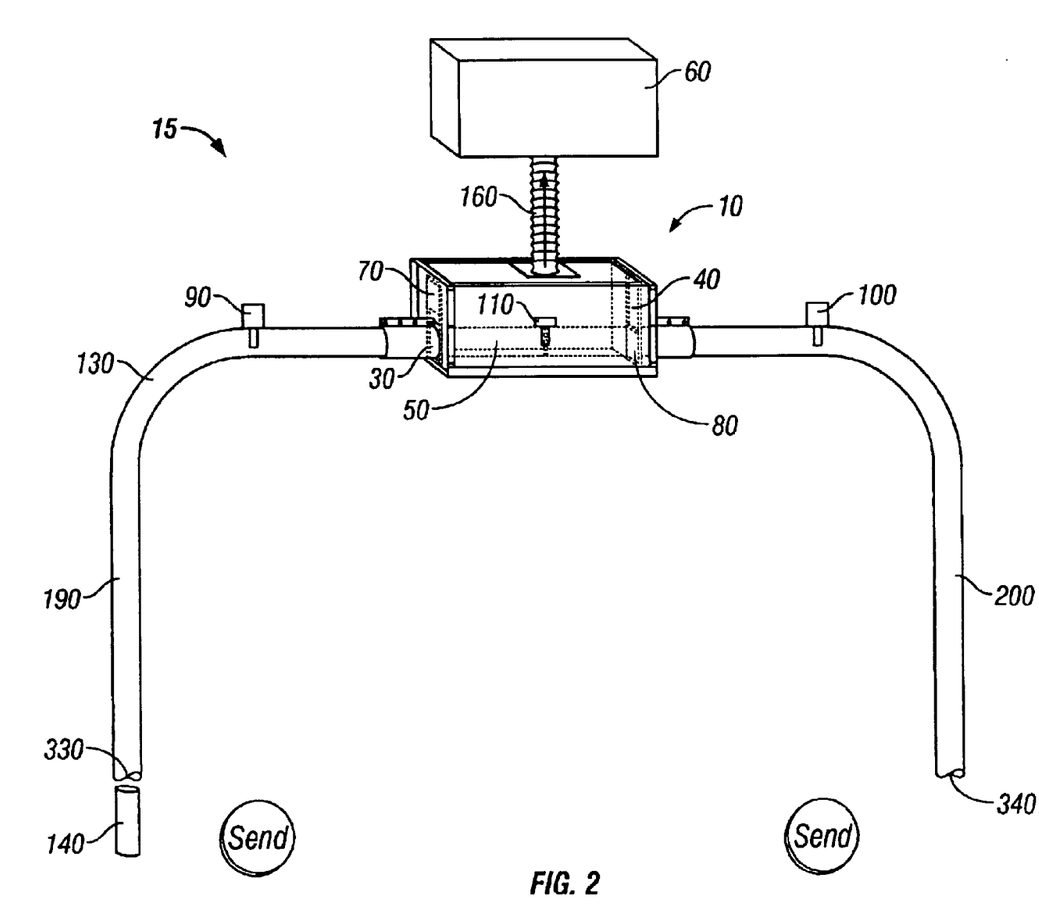
FIG. 2 shows the operation and position of the device and system when teller send button is actuated.
Figure 3:
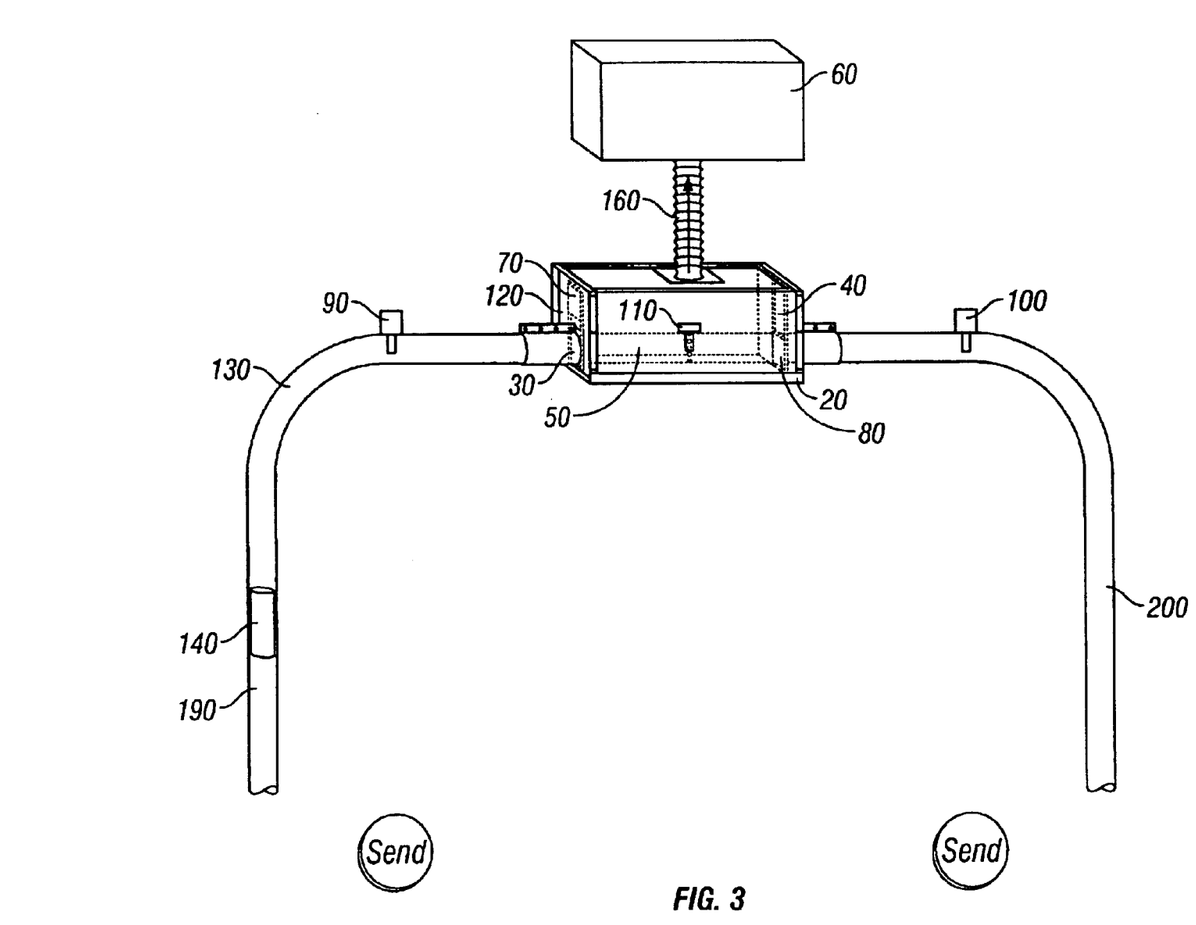
FIG. 3 shows the operation and position of the device and system when the carrier is ascending within the system.

When the system 15 is at rest as shown in FIG. 1, the customer gate 80 is in the open position and the teller gate 70 is in the closed position. When a teller desires to have an object transferred by the system 15, the teller places the object within the carrier 140. The carrier 140 is then placed in the teller sending and receiving station 330. When the send button at the teller station 330 is pressed, the position of the gates 70, 80 are switched to where the customer gate 80 is moved into the closed position and the teller gate 70 is moved to the open position as shown in FIG. 2. The turbine 60 is then activated (depicted as an arrow in the turbine hose) to create a vacuum within the conduit 130 on the teller side 190 of the system 15. A pressure difference is then created across the carrier 140, atmospheric pressure on one side and below atmospheric pressure on the other. This pressure difference causes the carrier 140 to rise within the conduit 130 as shown in FIG. 3.

Figure 4:
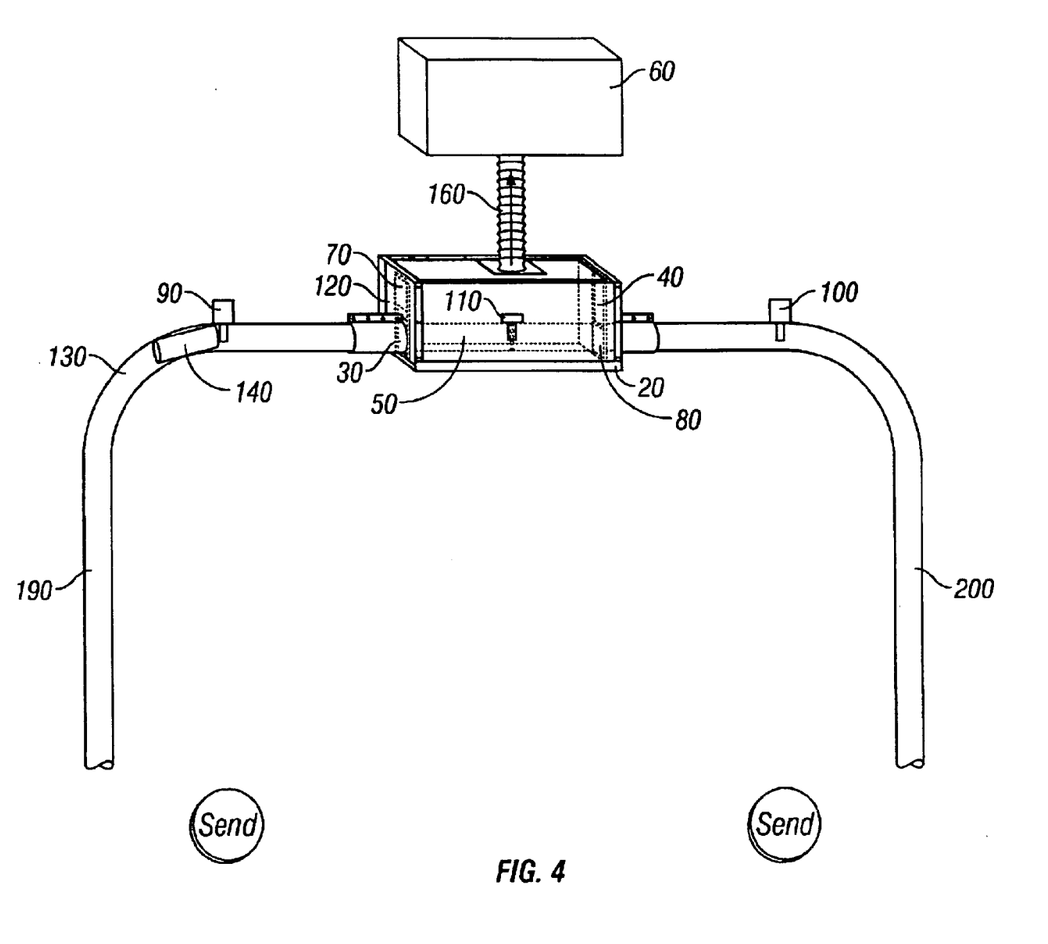
FIG. 4 shows the operation and position of the device and system when the carrier moves through the teller side conduit and approaches the device.
Figure 5:
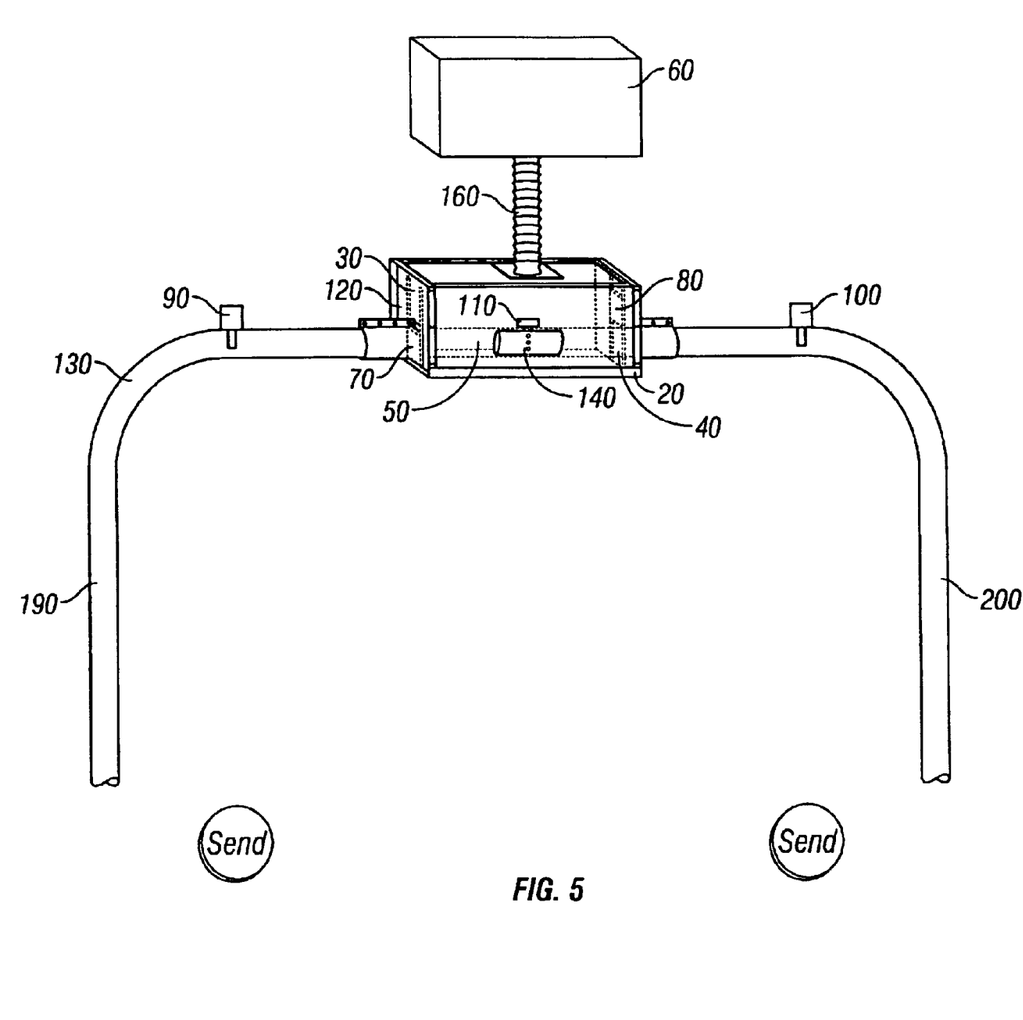
FIG. 5 shows the operation and the position of the device and system when the shifter sensor deactivates the turbine and reverses the position of the gates.
Figure 6:
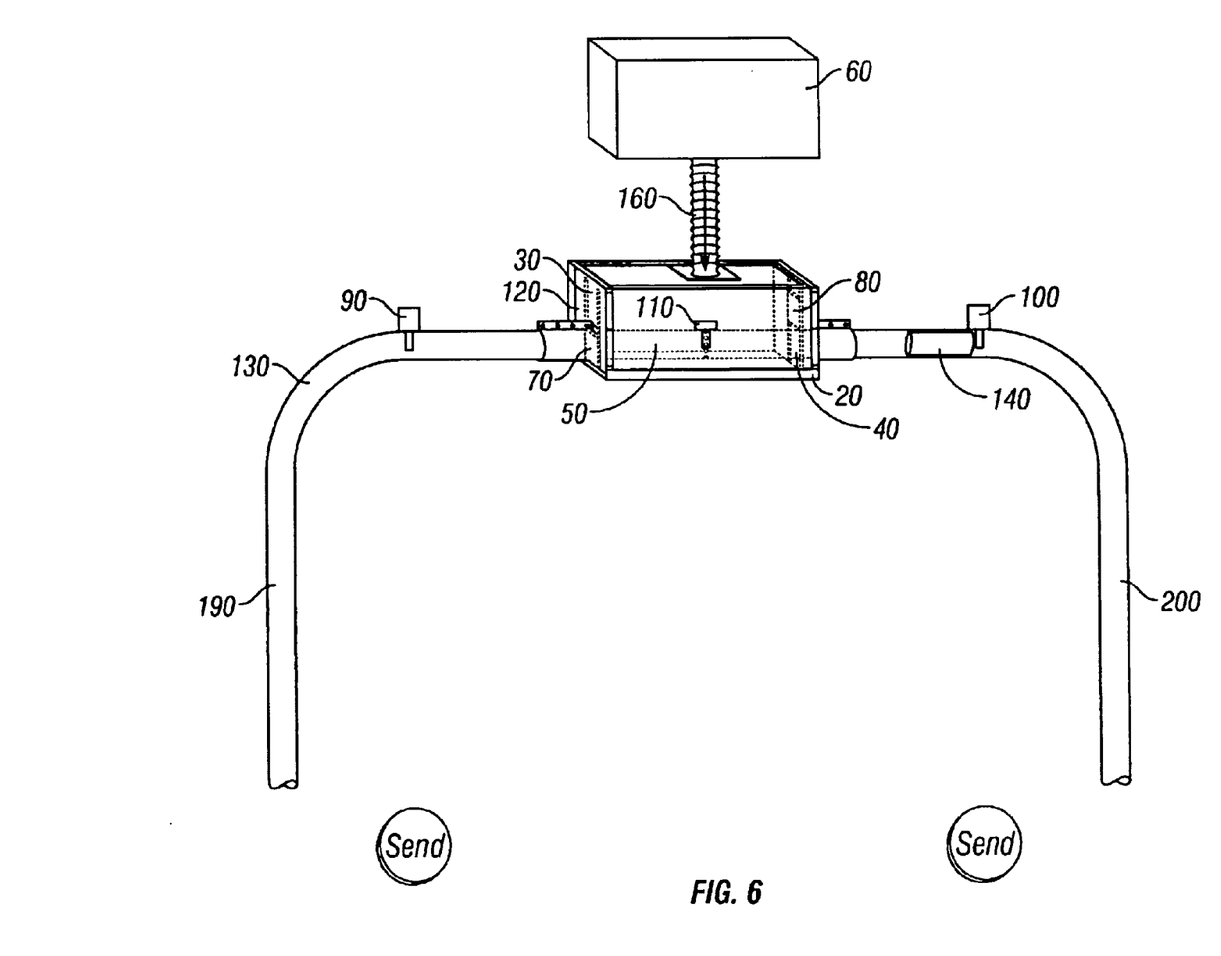
FIG. 6 shows the operation and the position of the device and system when the carrier leaves the device.

As the carrier 140 passes the teller sensor 90 during this part of the cycle, the activation of the teller sensor 90 is ignored by the programmable logic controller (PLC) as shown in FIG. 4. When the carrier 140 enters the air shifter housing 20 and activates the air shifter sensor 110, shutting off the turbine and reversing the position of the gates 70, 80 so that the teller gate 70 is in the closed position and the customer gate 80 is in the open position as shown in FIG. 5. The pressure turbine 60 is then activated, pushing the carrier 140 from the air shifter housing 20 and into the customer side of the system 200 as shown in FIG. 6.

Figure 7:
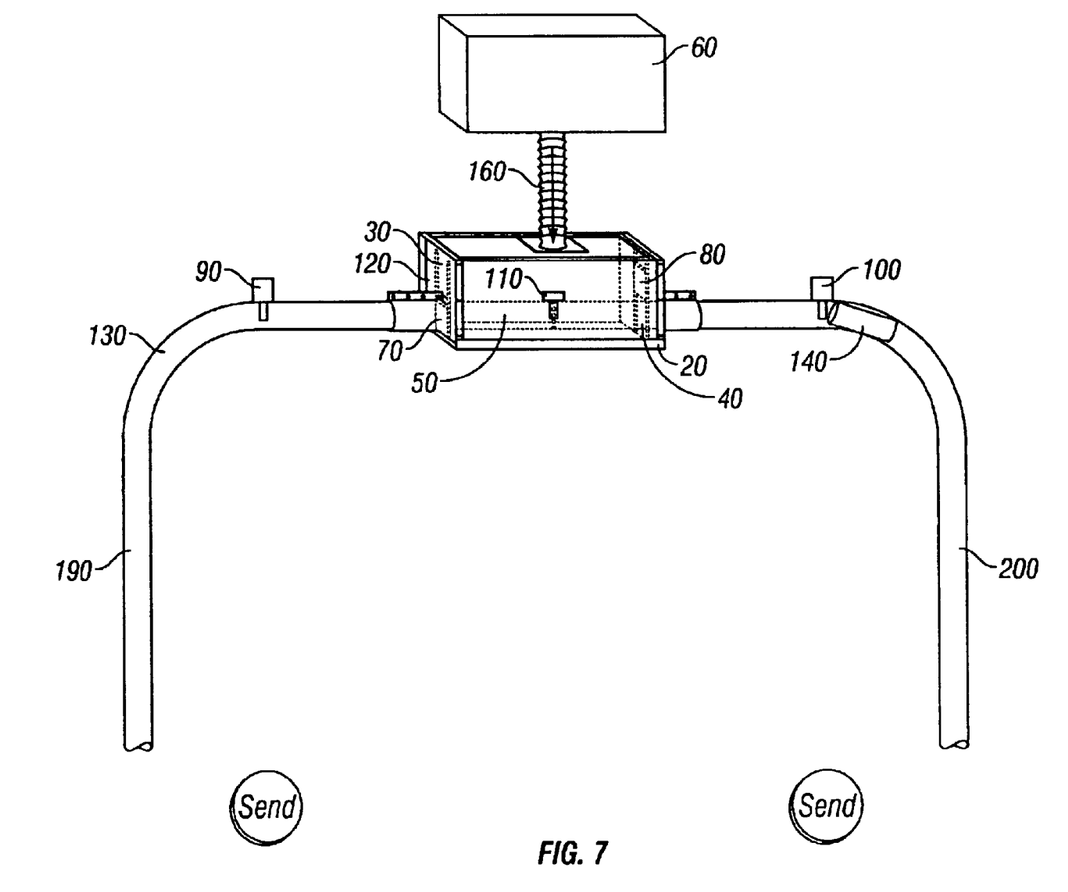
FIG. 7 shows the operation and position of the device and system when the carrier actuates the customer sensor.
Figure 8:
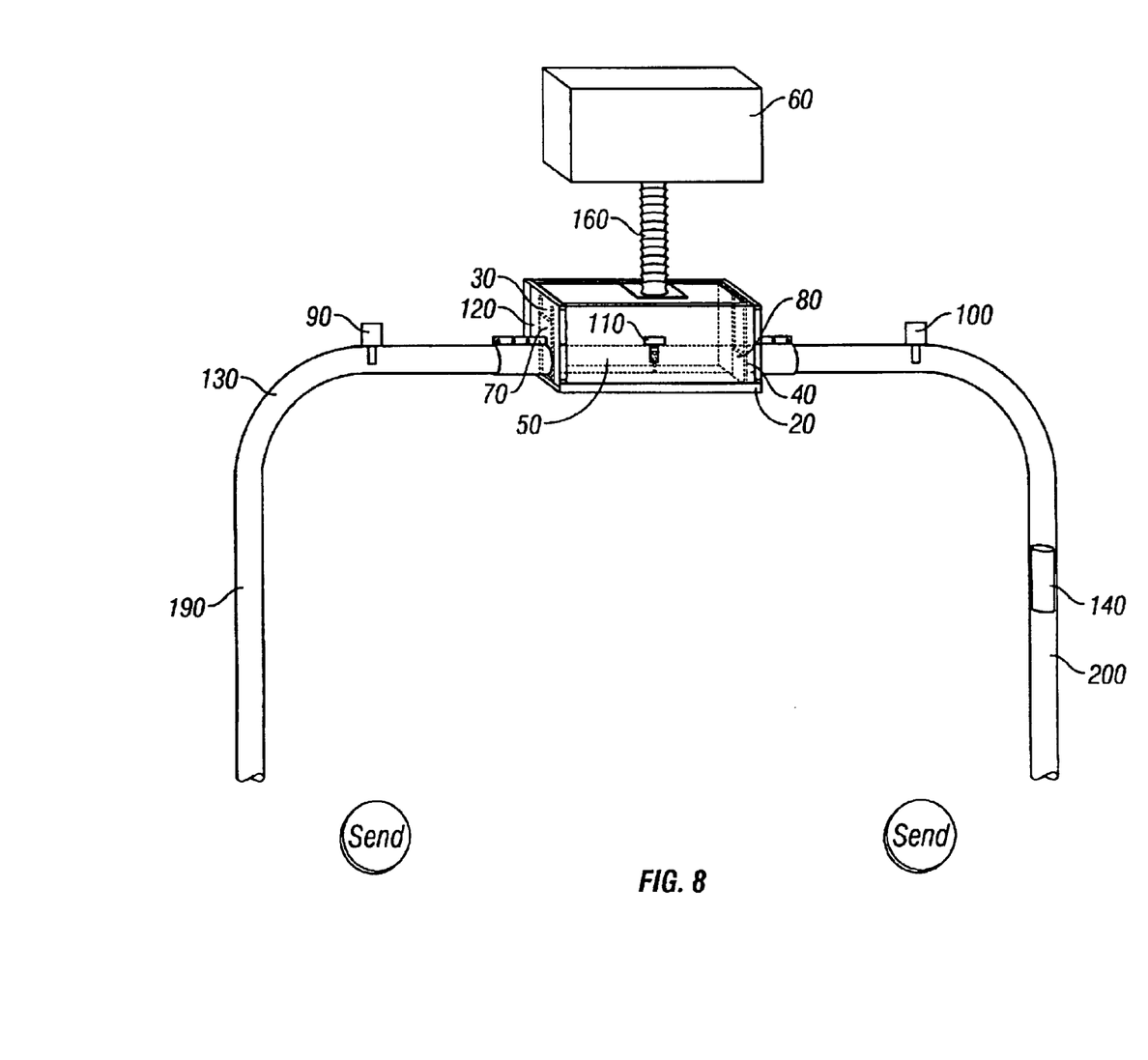
FIG. 8 shows the operation and position of the device and system when the carrier is descending within the system.
Figure 9:
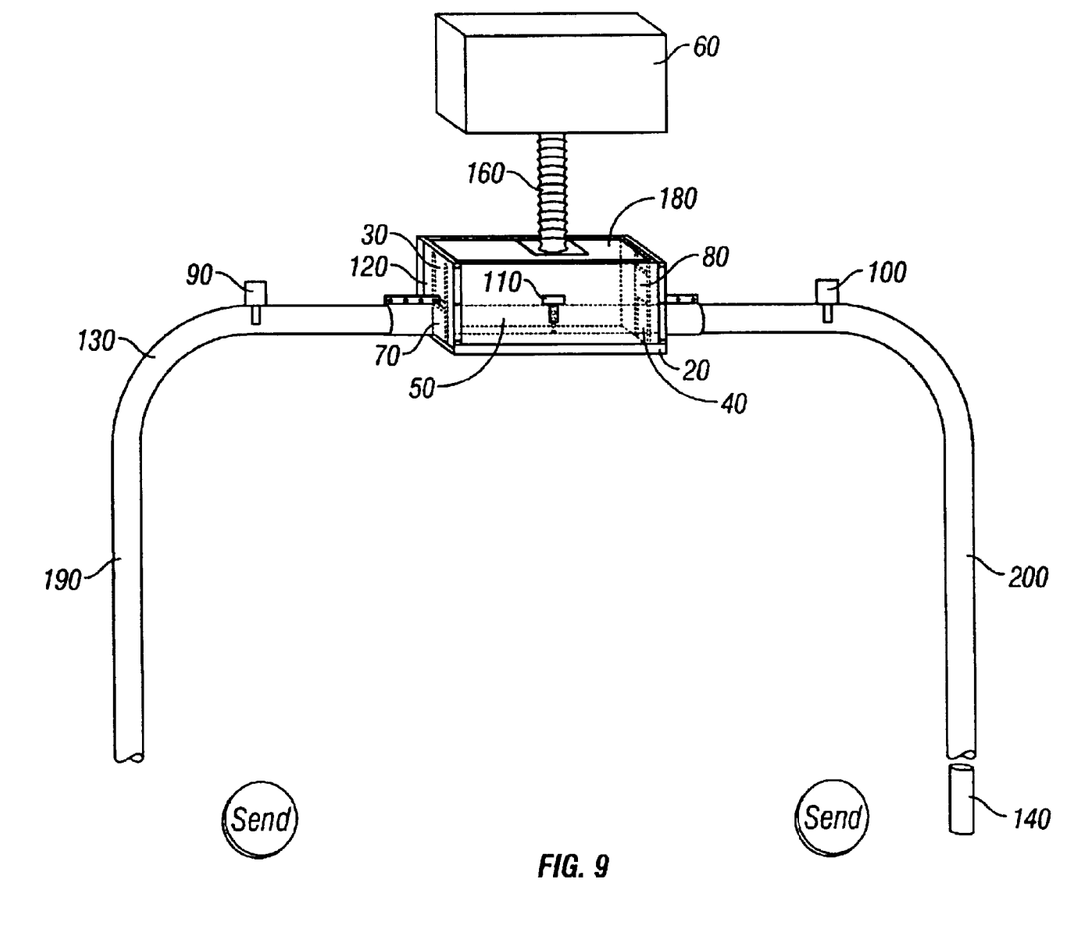
FIG. 9 shows the carrier arriving at the customer sending and receiving station.

The carrier 140 activates the customer sensor 100 as the carrier 140 moves past the sensing portion of the customer sensor 100 as shown in FIG. 7. This simultaneously deactivates the turbine and reverses the gate position so that the teller gate 70 is in the open position and the customer gate 80 is in the closed position as shown in FIG. 8, preventing further movement of air behind the carrier 140 stopping the motion of the carrier 140. Gravity and the momentum of the carrier 140 moves the carrier 140 through the bend in the conduit and enters the vertical portion of the customer side of the conduit system 200 where gravity alone allows the carrier 140 to fall within the conduit bringing the carrier 140 to the sending and receiving station at the customer station 350 as shown in FIG. 9. The carrier 140 moves slowly down the conduit 130 as atmospheric air pressure rushes between the seal rings about the carrier 140 and the inner walls of the conduit 130 due to the seal rings restricting the flow of atmospheric pressure past the falling carrier 140 into the conduit 130 above the carrier 140.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A pneumatic transfer system having a modular pneumatic shifting device, the system comprising:
   a teller side conduit having an interior, a first end and a second end;
   a teller sending and receiving station adjacent the first end of the teller side conduit;
   a customer side conduit having an interior, a first end and a second end;
   a customer sending and receiving station adjacent the first end of the customer side conduit;
   a shifting device comprising a housing having a teller side aperture connected to the second end of the teller side conduit and a customer side aperture connected to the second end of the customer side conduit;
   a center transfer tube connecting the teller side aperture and the customer side aperture;
   at least one movoable teller gate within the housing adjacent the teller side aperture, the teller gate intermittently obstructing the teller side aperture;
   at least one moveable customer gate within the housing adjacent the customer side aperture, the customer gate intermittently obstructing the customer side aperture;
   at least one differential pressure generating mechanism connected to the housing;
   at least one teller sensor having a sensing portion sized and shaped to fit within the teller conduit sensing when an object sized and shaped to fit within the conduit moves past the sensing portion of the teller sensor, the teller sensor intermittently activating movement of the teller gate, customer gate and differential pressure generating mechanism;
   at least one customer sensor having a sensing portion sized and shaped to fit within the customer conduit sensing when an object sized and shaped to fit within the conduit moves past the sensing portion of the customer sensor, the customer sensor intermittently ativaduig movement of the teller gate, customer gate and differential pressure generating mechanism;
   at least one shifter sensor having a sensing portion within the center transfer tube sensing when an object sized and shaped to fit within the conduit moves past the sensing portion of the shifter sensor.

2. The system of claim 1 wherein the teller side aperture and the customer side aperture are coaxially aligned.

3. The system of claim 2 wherein the operation of the teller gate and the customer gate are linked such that only one of the gates will obstruct the teller side aperture or the customer side aperture.

4. The system of claim 3 wherein the housing is approximately centrally located between the teller sending and receiving station and the customer sending and receiving station.

5. The system of claim 4 wherein the teller gate and the customer gate are spaced at a distance apart such that at least one carrier sized and shaped to fit within the conduit will fit between the teller gate and the customer gate.

6. The system of claim 5 further comprising a carrier sized and shaped to cooperatively fit within the conduit.

7. A pneumatic transfer system, the system comprising:
   a pipe having an interior, a first end and a second end;
   a first sending and receiving station adjacent the first end of the pipe;
   a second sending and receiving station adjacent the second end of the pipe;
   at least one differential pressure generating mechanism positioned between the first station and the second station creating a pressure differential within the interior of the pipe;
   at least one movable sending gate positioned between the first station and the differential pressure generating mechanism, the sending gate intermittently obstructing the interior of the pipe;
   at least one movable receiving gate positioned between the second station and the differential pressure generating mechanism, the receiving gate intermittently obstructing the interior of the pipe;
   at least one sending sensor positioned between the sending gate and the first station, the sending sensor intermittently activating movement of the sending gate, the receiving gate and the differential pressure generating mechanism;
   at least one receiving sensor positioned between the receiving gate and the second station, the receiving sensor intermittently activating movement of the sending gate, the receiving gate and the differential pressure generating mechanism;
   at least one shifter sensor positioned between the sending gate and the receiving gate.

8. The system of claim 7 wherein the sending gate and the receiving gate are coaxially aligned.

9. The system of claim 8 wherein the operation of the sending gate and the receiving gate are linked such that only one of the gates will obstruct the pipe at any one point in time.

10. The system of claim 9 wherein the teller gate and the customer gate are spaced at a distance apart such that at least one carrier sized and shaped to fit within the pipe will fit between the sending gate and the receiving gate.

11. The system of claim 10 wherein the differential pressure generating mechanism is connected to the pipe at the approximate center of the pipe.

12. A pneumatic shifting device for moving objects in a pneumatic transfer system, the system comprising:
   a housing having a teller side aperture sized and shaped to receive a pneumatic transfer system conduit and a customer side aperture sized and shaped to receive a pneumatic transfer system conduit;
   a center transfer tube connecting the teller side aperture and the customer side aperture;
   at least one differential pressure generating mechanism having a connection to the housing;

at least one moveable teller gate adjacent the teller side aperture, the teller gate intermittently obstructing the teller side aperture;

at least one moveable customer gate adjacent the customer side aperture, the customer gate intermittently obstructing the customer side aperture;

at least one teller sensor having a sensing portion sized and shaped to fit within a pneumatic transfer system conduit sensing when an object sized and shaped to fit within the conduit moves past the sensing portion of the teller sensor, the teller sensor intermittently activating movement of the teller gate, customer gate and differential pressure generating mechanism;

at least one customer sensor having a sensing portion sized and shaped to fit within a pneumatic transfer system conduit sensing when an object sized and shaped to fit within the conduit moves past the sensing portion of the customer sensor, the customer sensor intermittently activating movement of the teller gate, customer gate and differential pressure generating mechanism;

at least one shifter sensor having a sensing portion within the center transfer tube sensing when an object sized and shaped to fit within the conduit moves past the sensing portion of the shifter sensor.

13. The device of claim 12 wherein the teller side aperture and the customer side aperture are coaxially aligned.

14. The device of claim 13 wherein the operation of the teller side gate and the customer side gate are linked such that only one of the gates will obstruct either the teller side aperture or the customer side aperture.

15. The device of claim 14 wherein the teller gate and the customer gate are spaced at a distance apart such that at least one carrier sized and shaped to fit through the teller side aperture and the customer side aperture will fit between the sending gate and the receiving gate.

16. A pneumatic transfer system having a modular pneumatic shifting device, the system comprising:

a teller side conduit having an interior, a first end and a second end;

a teller sending and receiving station adjacent the first end of the teller side conduit;

a customer side conduit having an interior, a first end and a second end;

a customer sending and receiving station adjacent the first end of the customer side conduit;

a shifting device comprising a housing having a teller side aperture connected to the second end of the teller side conduit and a customer side aperture connected to the second end of the customer side conduit;

at least one moveable teller gate within the housing adjacent the teller side aperture, the teller gate intermittently obstructing the teller side aperture;

at least one moveable customer gate within the housing adjacent the customer side aperture, the customer gate intermittently obstructing the customer side aperture;

at least one teller sensor having a sensing portion sized and shaped to fit within the teller conduit sensing when an object sized and shaped to fit within the conduit moves past the sensing portion of the teller sensor, the teller sensor intermittently activating movement of the teller gate, customer gate and differential pressure generating mechanism;

at least one customer sensor having a sensing portion sized and shaped to fit within the customer conduit sensing when an object sized and shaped to fit within the conduit moves past the sensing portion of the customer sensor, the customer sensor intermittently activating movement of the teller gate, customer gate and differential pressure generating mechanism;

at least one shifter sensor having a sensing portion within the housing sensing when an object sized and shaped to fit within the conduit moves past the sensing portion of the shifter sensor.

17. The system of claim 16 wherein the teller side aperture and the customer side aperture are coaxially aligned.

18. The system of claim 17 wherein the operation of the teller side gate and the customer side gate are linked such that only one of the gates will obstruct either the teller side aperture or the customer side aperture.

19. The system of claim 18 wherein the teller gate and the customer gate are spaced at a distance apart such that at least one carrier sized and shaped to fit through the teller side aperture and the customer side aperture will fit between the sending gate and the receiving gate.

20. A method of pneumatically moving an object through a pneumatic transfer system, the method comprising:

introducing a first obstruction creating an interior first section of a tube system adjacent a first end of a transition point;

introducing an object sized and shaped to cooperatively fit within the tube system into the first section of the tube system;

operating a pressure differential generating mechanism at the transition point creating a pressure difference across the object within the first section moving the object within the interior of the first section toward the transition portion;

sensing the object at the transition point;

deactivating the pressure differential generating mechanism upon sensing of the object at the transition point;

removing the first obstruction;

introducing a second obstruction creating an interior second section of the tube system adjacent a second end of the transition point;

operating the pressure differential generating mechanism at the transition point creating a pressure difference across the object within the second section moving the object within the second section;

sensing movement of the object past a point within the second section;

deactivating the pressure differential generating mechanism upon sensing movement of the object past the point within the second section.

21. In a building structure including an automobile drive through service window and an overhead structure having pneumatic transfer system, the improvement comprising:

a pneumatic conduit for pneumatically delivering objects attached to the overhead structure;

a housing attached to the overhead structure and connected into the pneumatic conduit having a teller side aperture with a moveable teller gate adjacent the teller side aperture and within the housing and a customer side aperture with a moveable customer gate adjacent the customer side aperture and within the housing;

at least one differential pressure generating mechanism connected to the overhead structure;

at least one teller sensor adjacent the teller side aperture of the housing connected to the pneumatic conduit sensing when an abject sized and shaped to fit within the conduit moves past the teller sensor intermittently activating movement of the teller gate, customer gate and differential pressure generating mechanism;

at least one customer sensor adjacent the customer side aperture of the housing connected to the pneumatic conduit sensing when an object sized and shaped to fit within the conduit moves past the teller sensor intermittently activating movement of the teller gate, customer gate and differential pressure generating mechanism;

at least one shifter sensor having a sensing portion within the housing sensing when an object sized and shaped to fit within the conduit moves past the sensing portion of the shifter sensor.

22. The system of claim 21 wherein the teller side aperture and the customer side aperture are coaxially aligned.

23. The system of claim 22 wherein the operation of the teller gate and the customer gate are linked such that only one of the gates will obstruct the teller side aperture or the customer side aperture.

24. The system of claim 23 wherein the teller gate and the customer gate are spaced at a distance apart such that at least one carrier sized and shaped to fat within the conduit will fit between the teller gate and the customer gate.

25. The system of claim 24 further comprising a carrier sized and shaped to cooperatively fit within the conduit.

26. A pneumatic transfer system, the system comprising;

a pipe having an interior, a first end and a second end;

a first sending and receiving station adjacent the first end of the pipe;

a second sending and receiving station adjacent the second end of the pipe;

at least one differential pressure generating mechanism positioned between the first station and the second station creating a pressure differential within the interior of the pipe;

at least one movable sending gate positioned between the first station and the differential pressure generating mechanism, the sending gate intermittently obstructing the interior of the pipe;

at least one movable receiving gate in coaxial alignment with the sending gate and positioned between the second station and the differential pressure generating mechanism, the receiving gate intermittently obstructing the interior of the pipe;

at least one sending sensor positioned between the sending gate and the first station, the sending sensor intermittently activating movement of the sending gate, the receiving gate and the differential pressure generating mechanism;

at least one receiving sensor positioned between the receiving gate and the second station, the receiving sensor intermittently activating movement of the sending gate, the receiving gate and the differential pressure generating mechanism;

at least one shifter sensor positioned between the sending gate and the receiving gate.

27. The system of claim 26 wherein the operation of the sending gate and the receiving gate are linked such that only one of the gates will obstruct the pipe at any one point in time.

28. The system of claim 27 wherein the teller gate and the customer gate are spaced at a distance apart such that at least one carrier sized and shaped to fit within the pipe will fit between the sending gate and the receiving gate.

29. The system of claim 28 wherein the differential pressure generating mechanism is connected to the pipe at the approximate center of the pipe.

* * * * *